A. MILLER.
MACHINE FOR EXTERMINATING WEEDS.
APPLICATION FILED MAY 20, 1913.
1,099,712.
Patented June 9, 1914.
2 SHEETS—SHEET 1.
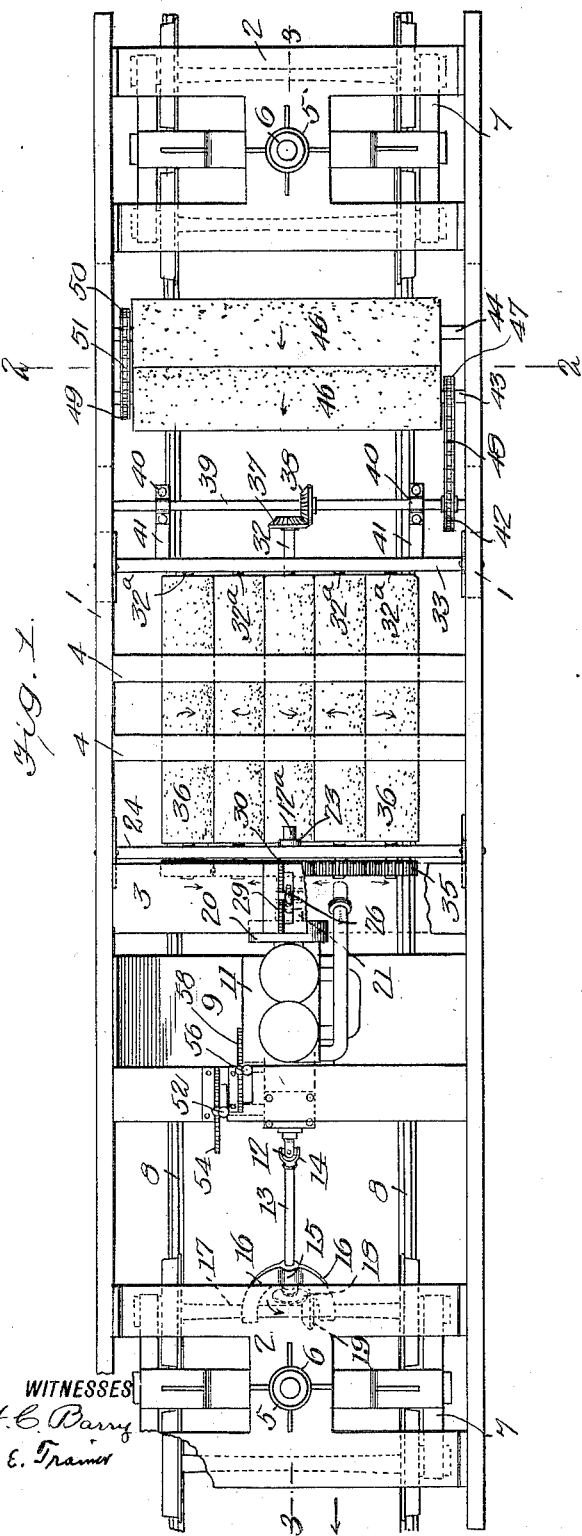
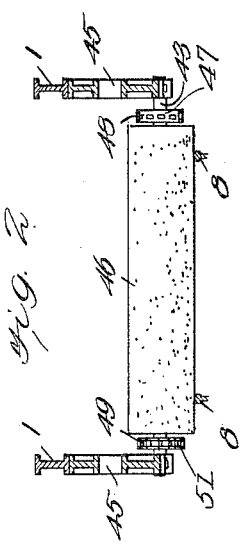
WITNESSES
F. C. Barry
C. E. Tramer
INVENTOR
Arthur Miller
BY Munn & Co.
ATTORNEYS A. MILLER.
MACHINE FOR EXTERMINATING WEEDS.
APPLICATION FILED MAY 20, 1913.
1,099,712.
Patented June 9, 1914.
2 SHEETS—SHEET 2.
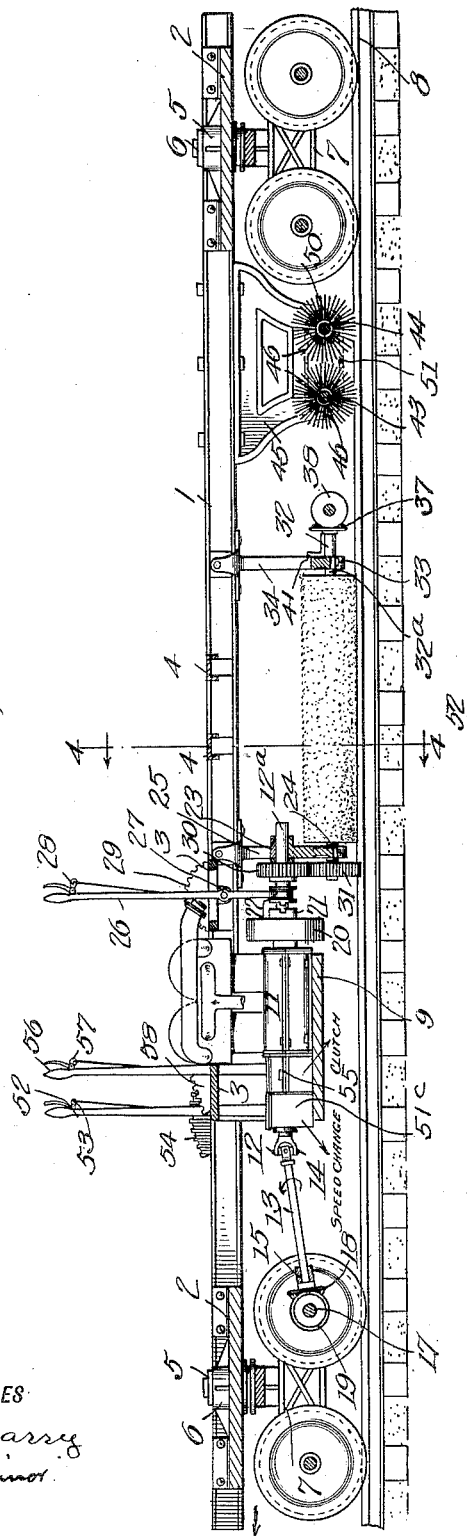
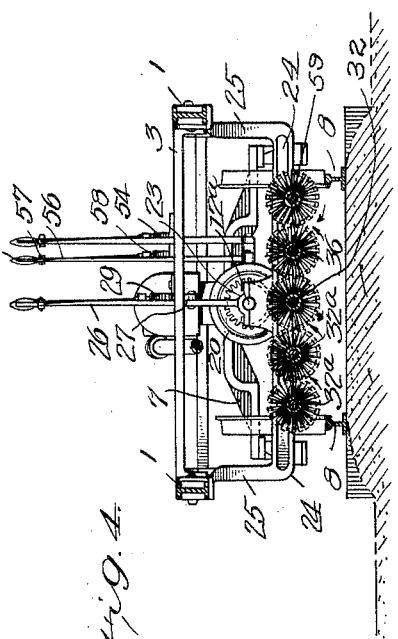
WITNESSES
F. C. Barry
C. E. Trainor
INVENTOR
Arthur Miller
BY Munn & Co.
ATTORNEYS

UNITED STATES PATENT OFFICE.

ARTHUR MILLER, OF KIESTER, MINNESOTA.

MACHINE FOR EXTERMINATING WEEDS.

1,099,712.  Specification of Letters Patent.  Patented June 9, 1914.

Application filed May 20, 1913. Serial No. 768,760.

*To all whom it may concern:*

Be it known that I, ARTHUR MILLER, a citizen of the United States, and a resident of Kiester, in the county of Faribault and State of Minnesota, have made certain new and useful Improvements in Machines for Exterminating Weeds, of which the following is a specification.

My invention is an improvement in machines for exterminating weeds, and has for its object to provide a machine of the character specified, especially adapted for use on railroads, and arranged in such manner that it may propel itself along the railroad, and having mechanism which during its motion will uproot and remove the weeds growing between the rails.

In the drawings: Figure 1 is a top plan view of the machine, Figs. 2 and 3 are sections on the lines 2—2 and 3—3, respectively, of Fig. 1, and Fig. 4 is a section on the line 4—4 of Fig. 3, looking in the direction of the arrows.

The present embodiment of the invention comprises a body frame composed of longitudinally extending rails or bars 1, which are connected at their ends by H-shaped plates 2, and intermediate their ends by cross plates 3 and cross bars 4. The H-shaped plates 2 are of wood as shown, reinforced with metal coverings, and each of the said plates carries at its center a bearing 5, in which is journaled the journal pin 6 of a pair of trucks 7, the wheels of the trucks being adapted to run upon the rails 8 of the track.

A platform 9 depends from the frame intermediate its ends and near the front truck the said platform being supported by hangers 10. A motor 11, as for instance a gasolene engine, is supported on the platform, and the engine shaft 12 is connected to a driving shaft 13 extending toward the front trucks by means of a universal joint 14. The shaft 13 is journaled at its front end in a bearing provided in the body 15 of a yoke, whose arms 16 are provided with bearings for engaging the rear axle 17 of the front truck. The shaft is provided with a bevel gear wheel 18, which meshes with a similar gear 19 secured to the said shaft 17, and it will be evident that by means of the engine the machine may be propelled along the track.

A fly wheel 20 is secured to the engine shaft at the opposite end from the shaft 13, and one section 21 of a clutch is connected with the said fly wheel. A shaft $12^a$ is journaled in alinement with the engine shaft in sectional bearings 23 supported by the body 24 of a U-shaped hanger whose arms 25 are connected with the side bars 1 of the frame. The movable section 22 of the clutch is feathered on the shaft 12, and is movable toward and from the section 21 by means of a lever 26. The lever is pivoted to the frame at 27, and is provided with the usual latch mechanism 28 coöperating with a toothed quadrant 29 to hold the lever in adjusted position.

A gear wheel 30 is secured to the shaft $12^a$ adjacent to the bearings 23, and the said gear wheel meshes with a similar gear 31 on a shaft 32 journaled in the hanger 24—25 and a similar hanger consisting of a body 33 and arms 34, the arms being connected to the side bars 1 of the frame. The shaft 32 is the central shaft of a series of five shafts $32^a$, journaled at their ends on the hanger bodies 24 and 33. Each of the said shafts $32^a$ is provided at its front end with a gear wheel 35, the said gear wheels meshing with each other and with the gear wheel 31 of the central shaft.

Each of the shafts 32 and $32^a$ is provided with bristles 36 as shown, the shafts and the bristles constituting cylindrical brushes arranged to rotate on axes longitudinal to the track and to the frame. The shafts are so arranged, and the bristles are of such length, that the bristles of the adjacent rollers contact at their peripheries, and the shaft 32 is extended rearwardly beyond the hanger body 33, and the rear end is provided with a bevel gear wheel 37. The bevel gear 37 meshes with a similar gear 38 on a cross shaft 39, journaled in bearings 40 on arms 41 extending rearwardly from the hanger body 34, and near one end the said shaft is provided with a sprocket wheel 42. Other shafts 43 and 44 are journaled transversely of the frame in hanger plates 45 depending from the side bars 1, and each of the said shafts is provided with bristles 46, the shafts and the bristles constituting cylindrical brushes extending transversely of the track and the frame. The shaft 43 is provided with a sprocket wheel 47 at the end adjacent to the sprocket wheel 42, and a sprocket chain 48 connects the two wheels. The said shaft 43 is also provided with a sprocket wheel 49 at its opposite end, and the shaft 44 has a similar wheel 50. A sprocket chain 51 engages the wheels 49 and 50, so that both shafts 43 and 44 rotate together, and are driven by the shaft 39.

Speed changing mechanism is provided in connection with the engine, the said mechanism being inclosed in a casing 51$^c$, and being operated by means of a lever 52, having the usual latch mechanism 53 coöperating with a toothed segment 54 on the frame for holding the lever in adjusted position. By means of the lever 52 the relative speed of the engine and the shaft 17 may be varied. A clutch is also provided in the casing 55 arranged on the platform 9, for connecting the engine to the shaft 12, and the said clutch is operated by the lever 56. The lever 56 is provided with the usual latch mechanism 57 coöperating with a toothed segment 58, for holding the lever in adjusted position. By means of the lever 56 the engine may be released from the axle 17, and by means of the lever 26 the said engine may be connected with the shaft 12$^a$. When so connected, the shafts 32 and 32$^a$ are driven to operate the brushes, and through the shaft 39 the shafts 43 and 44 are driven. The speed changing mechanism in the casing 51$^c$ and the clutch in the casing 55 are of the usual construction, forming in fact a part of the engine and no part of the present invention, and for this reason the said mechanisms are not more fully shown and described.

Each of the shafts 32—32$^a$—43—44 is provided with a sleeve 59, as shown more particularly in Fig. 4, and the bristles 36 and 46 are connected with the sleeves. The longitudinally arranged cylindrical brushes are between the rails, as shown in Fig. 4, while the transverse brushes are extended beyond the rails at both ends, as shown more particularly in Fig. 1.

The engine 11 may be of any desired or usual construction, and operates in the usual manner.

In operation, the improved machine is driven to the place where it is desired to exterminate the weeds, with the brushes disconnected from the engine. That is the lever 26 is in the position of Fig. 3, with the clutch section 22 disconnected from the section 21. When it is desired to operate on the weeds, the clutch section 22 is connected with the section 21. As the car now moves along the track slowly, the brushes, both the longitudinally arranged and the transversely arranged, rotate in contact with the weeds, tearing them out of the ground, where they will soon be withered and killed by the action of the sun. The adjacent longitudinally arranged brushes rotate in opposite directions, and they will sweep the weeds laterally, drawing them up between the adjacent brushes, or passing them laterally, but thoroughly cleaning the ground from all growths that may be thereon. The device is easily operated and requires the services of but a single operator.

I claim:—

1. A machine of the character specified, comprising a car, hangers arranged transversely of the car intermediate the ends thereof and in spaced relation, shafts journaled parallel with each other longitudinally of the car in the hangers, a gear wheel on each shaft at the front end thereof, the said gear wheels meshing with each other, each of the said parallel shafts being provided with radial bristles, hangers depending from the car at each side thereof near the first-named hangers, shafts journaled transversely of the car in the last-named hangers, bristles extending radially from each of said shafts, a driving connection between the shafts, a shaft journaled transversely of the frame below the same and having a driving connection with one of the parallel shafts, a driving connection between said last-named shaft and the adjacent transverse shaft, and means for driving one of the parallel shafts.

2. A machine of the character specified, comprising a car, hangers arranged transversely of the car intermediate the ends thereof, a series of cylindrical brushes arranged longitudinally of the car on the hangers and parallel with each other, a driving connection between the brushes, hangers at opposite sides of the car adjacent to said brushes, cylindrical brushes supported by the last-named hangers transversely of the car, a driving connection between the said brushes and the first-named brushes, and means for driving one of the first-named brushes.

3. A machine of the character specified, comprising a car, trucks for supporting the car, a series of cylindrical brushes arranged longitudinally of the car, a connection between the brushes and the car for supporting said brushes, a series of cylindrical brushes arranged transversely of the car and supported by the car, a driving connection between the said brushes and the first-named brushes, and means for operating one of the said first-named brushes.

4. The combination with the car body and the trucks for supporting the said car body, of a series of cylindrical brushes supported below the car body intermediate the trucks, said brushes being arranged with their axes parallel and extending longitudinally of the car, the bristles of the brushes intermeshing, a pair of cylindrical brushes arranged transversely of the car body adjacent to the first-named brushes, the said brushes of the said pair having their bristles in contact, all of the said brushes being arranged to engage the track between the trucks of the car, a driving connection between the brushes of the first-named series, a driving connection between the brushes of the last-named series, a driving connection between the two series, and means on the car for moving the car, and for operating the brushes.

ARTHUR MILLER.

Witnesses:
CLARA SANDBRINK,
HERMAN EWALD.

Copies of this patent may be obtained for five cents each, by addressing the "Commissioner of Patents, Washington, D. C."